United States Patent
Ono et al.

(10) Patent No.: US 10,160,166 B2
(45) Date of Patent: Dec. 25, 2018

(54) PRODUCTION METHOD FOR FIBER-REINFORCED COMPONENT

(71) Applicant: THE JAPAN STEEL WORKS, LTD., Tokyo (JP)

(72) Inventors: Akio Ono, Hiroshima (JP); Takuya Niyama, Hiroshima (JP); Hiroshi Ito, Hiroshima (JP); Shoso Nishida, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 278 days.

(21) Appl. No.: 14/916,791

(22) PCT Filed: Sep. 3, 2014

(86) PCT No.: PCT/JP2014/073250
§ 371 (c)(1),
(2) Date: Mar. 4, 2016

(87) PCT Pub. No.: WO2015/033980
PCT Pub. Date: Mar. 12, 2015

(65) Prior Publication Data
US 2016/0221274 A1    Aug. 4, 2016

(30) Foreign Application Priority Data

Sep. 6, 2013  (JP) ................ 2013-185771

(51) Int. Cl.
*B29C 70/30* (2006.01)
*B29C 70/08* (2006.01)
(Continued)

(52) U.S. Cl.
CPC ............ *B29C 70/081* (2013.01); *B29C 45/14* (2013.01); *B29C 69/02* (2013.01); *B29C 70/18* (2013.01);
(Continued)

(58) Field of Classification Search
None
See application file for complete search history.

(56) References Cited

U.S. PATENT DOCUMENTS

| 4,783,298 A * | 11/1988 | Oda ................... B29C 37/0028 118/37 |
| 4,952,358 A * | 8/1990 | Okina ................ B29C 44/1209 264/102 |

(Continued)

FOREIGN PATENT DOCUMENTS

| CN | 1129920 A | 8/1996 |
| CN | 102049883 A | 5/2011 |

(Continued)

OTHER PUBLICATIONS

Office Action dated Dec. 23, 2016 issued by the State Intellectual Property Office of P.R. China in counterpart Chinese Patent Application No. 201480049341.6.

(Continued)

*Primary Examiner* — Edmund H Lee
(74) *Attorney, Agent, or Firm* — Sughrue Mion, PLLC

(57) ABSTRACT

A production method for a fiber-reinforced component according to the present invention includes: a step 1, in which a melt of a thermoplastic resin is formed in a lower die, a mat-shaped material formed from a reinforcing fiber B is placed on the melt, an upper die for pressing is closed on the lower die and is pressed, and an impregnation treatment is performed, and then, the mat-shaped material impregnated with the resin is cooled and solidified, whereby a main body part formed from a fiber-reinforced resin is molded; and a step 2, in which the upper die for pressing is opened, an upper die for injection molding is closed on the lower die to form an injection molding die, and then, injection molding is performed to form an additional part, (Continued)

(a)

(b)        (c)

whereby a fiber-reinforced component having the additional part combined with the main body part is molded.

13 Claims, 1 Drawing Sheet

(51) Int. Cl.
  *B29C 69/02* (2006.01)
  *B29C 70/46* (2006.01)
  *B29C 45/14* (2006.01)
  *B29C 70/18* (2006.01)
  B29K 105/08 (2006.01)
  B29K 105/12 (2006.01)
  B29K 105/20 (2006.01)
  B29K 307/04 (2006.01)
  B29L 31/30 (2006.01)
  B29L 31/34 (2006.01)
  B29K 101/12 (2006.01)

(52) U.S. Cl.
  CPC ...... *B29C 70/467* (2013.01); *B29C 45/14786* (2013.01); *B29K 2101/12* (2013.01); *B29K 2105/0809* (2013.01); *B29K 2105/0854* (2013.01); *B29K 2105/12* (2013.01); *B29K 2105/20* (2013.01); *B29K 2307/04* (2013.01); *B29L 2031/3055* (2013.01); *B29L 2031/3481* (2013.01)

(56) References Cited

U.S. PATENT DOCUMENTS

| | | | |
|---|---|---|---|
| 5,672,309 A | 9/1997 | Masui et al. | |
| 5,804,292 A | 9/1998 | Ishitoya et al. | |
| 6,328,920 B1 * | 12/2001 | Uchiyama | B29C 45/1635 264/255 |
| 6,616,879 B1 | 9/2003 | Kobayashi et al. | |
| 2007/0230196 A1 * | 10/2007 | Wang | B29C 70/46 362/417 |
| 2011/0104971 A1 | 5/2011 | Ma et al. | |

FOREIGN PATENT DOCUMENTS

| | | |
|---|---|---|
| CN | 103269841 A | 8/2013 |
| EP | 0423676 A2 | 4/1991 |
| EP | 0547625 A1 | 6/1993 |
| JP | 02059319 * | 2/1990 |
| JP | 3-2011 A | 1/1991 |
| JP | 6-328482 A | 11/1994 |
| JP | 11-129371 A | 5/1999 |
| JP | 2000-343547 A | 12/2000 |
| JP | 2005-298664 A | 10/2005 |
| JP | 2007-76081 A | 3/2007 |
| JP | 2009-51080 A | 3/2009 |
| JP | 2010-253938 A | 11/2010 |
| JP | 2010-274636 A | 12/2010 |
| JP | 2014-125532 A | 7/2014 |
| JP | 2014-138993 A | 7/2014 |

OTHER PUBLICATIONS

Search Report dated Nov. 25, 2014 by the International Searching Authority in related Application No. PCT/JP2014/073250, (PCT/ISA/210).

Written Opinion dated Nov. 25, 2014 by the International Searching Authority in related Application No. PCT/JP2014/073250, (PCT/ISA/237).

Search Report dated Mar. 13, 2017, issued by the European Patent Office in counterpart European Application No. 14842606.7.

* cited by examiner (a)   (b)

(a)   (b)   (c)

(a)   (b)

PRODUCTION METHOD FOR FIBER-REINFORCED COMPONENT

TECHNICAL FIELD

The present invention relates to a production method for a fiber-reinforced component molded by a press molding method and an injection molding method, which are favorably used for molding automobile body components, electrical equipment housing components, and the like, in combination.

BACKGROUND ART

Fiber-reinforced resins have excellent specific strength, moldability, and the like, and the application field thereof has been expanded. Specifically, fiber-reinforced resins have been studied for the application to general automobile body components, electrical equipment housing components, and the like, the mass production of which is expected.

In the application of fiber-reinforced resins to general automobile components or electrical equipment components, the development of fiber-reinforced resins with a glass fiber or a carbon fiber using a thermoplastic resin as a matrix has been progressed, and an increase in the fiber length of a reinforcing fiber contained in a molded product, and an increase in the content of a reinforcing fiber have been demanded. For example, PTL 1 proposes an automobile exterior component which is an injection molded product of a fiber-reinforced thermoplastic resin composition, wherein a reinforcing fiber in the molded product has a fiber length of 1.5 to 5.0 mm and a weight average distribution of 1 to 50%. Then, it is said that the reinforcing fiber in the molded product has a fiber length of 1.5 to 5.0 mm and a weight average distribution of 1 to 50%, preferably 5 to 50%, and a composition to be used for an automobile exterior component is obtained from a thermoplastic resin in an amount of 40 to 99% by weight and a reinforcing fiber in an amount of 60 to 1% by weight, preferably a thermoplastic resin in an amount of 50 to 75% and a reinforcing fiber in an amount of 50 to 25%.

General automobile components or electrical equipment components composed of such a fiber-reinforced resin have a shape in which a boss, a rib, or the like for attachment of various components is provided in a plate-shaped part, and in general, the plate-shaped part which forms a main body part is thin and has a large area, and a part which forms an additional part such as a boss or a rib has a complicated shape in many cases. Due to this, a production method capable of incorporating a reinforcing fiber having a long fiber length at a high volume content, and using a press molding method which is favorably used for production of a fiber-reinforced resinous component which is isotropic and has high strength and an injection molding method which is favorably used for mass production of a material having a complicated shape in combination has been proposed.

For example, PTL 2 proposes a production method for an integrally molded product including a step (I) in which a base material composed of a discontinuous reinforcing fiber and a resin is stacked, thereby forming a preform, a step (II) in which the preform having a charge ratio more than 100% is placed in a die and press molding is performed, and a step (III) in which after a sheet molded body obtained in the step (II) is inserted into an injection molding die, a thermoplastic resin is injection molded and integrated with the sheet molded body. It is said that according to this production method, by using a sheet molded body formed from a discontinuous reinforcing fiber and a resin as a primary molded body and integrating this molded body with a thermoplastic resin by injection molding, a thermoplastic resin molded body having high dynamic properties and a complicated shape can be easily obtained.

PTL 3 proposes a molding method for a fabric decorative resin product in which a transmissive sheet composed of a thermoplastic resin and a fabric sheet obtained by weaving a filament of the thermoplastic resin into a reinforcing fiber bundle are preformed by preheating and pressing in preforming dies, respectively, and these are overlapped with each other in an integrally molding die and hot-press molded to mold a decorative preform in which these are integrated with each other, and thereafter, the decorative preform is placed in an injection molding die, and a thermoplastic resin of the same quality as the thermoplastic resin is injection molded on a rear surface side, whereby a fabric decorative resin product is molded. It is said that according to this molding method, a fabric decorative resin product which is favorably used as a lightweight and highly rigid vehicle body component (for example, a cowl, or the like) can be molded economically by eliminating all steps such as a trimming operation and a post-installation operation for an attachment tool while maintaining the strength and design of the fabric sheet as they are.

CITATION LIST

Patent Literature

PTL 1: JP-A-2005-298664
PTL 2: JP-A-2010-253938
PTL 3: JP-A-2009-51080

SUMMARY OF INVENTION

Technical Problem

As the method proposed in PTL 2 or 3, a method in which first, a sheet-shaped prepreg formed from a reinforcing fiber is fabricated, and then, a material formed by stacking this prepreg or a material formed by stacking this prepreg and a resin sheet is press molded to mold a main body part, and this molded preform is transferred to an injection molding die and injection molded is adopted. Due to this, the number of steps is increased, and also energy efficiency is poor, and thus the method has a problem that the advantage of the injection molding method with high productivity is not utilized.

In view of such conventional problems, an object of the invention is to provide a production method for a fiber-reinforced component capable of efficiently molding a fiber-reinforced component in which the average fiber length is long and the content of a reinforcing fiber is high and producing automobile body components, electrical equipment housing components, and the like with high productivity by using a press molding method and an injection molding method in combination.

Solution to Problem

A production method for a fiber-reinforced component according to the present invention comprises: a step 1, in which a melt of a thermoplastic resin is formed in a lower die, a mat-shaped material formed from a reinforcing fiber B is placed on the melt, an upper die for pressing is closed on the lower die and is pressed, and an impregnation treatment is performed, and then the mat-shaped material impregnated with the thermoplastic resin is cooled and solidified, whereby a main body part obtained from a fiber-reinforced resin is molded; and a step 2, in which the upper die for pressing is opened, an upper die for injection molding is closed on the lower die to form an injection molding die, and then injection molding is performed to form an additional part, whereby a fiber-reinforced component having the additional part combined with the main body part is molded.

In the above invention, the melt may be formed only from a thermoplastic resin or formed from a thermoplastic resin containing a reinforcing fiber A. The reinforcing fiber A may have an average fiber length of 0.1 to 25 mm. Further, the reinforcing fiber B may have an average fiber length of 1 to 100 mm.

Further, the volume content of the reinforcing fiber in the main body part of the fiber-reinforced component may be from 10 to 70%.

The additional part may contain a reinforcing fiber M having an average fiber length of 0.1 to 25 mm at a volume content of 0 to 50%. The additional part may be a convex part, a boss, a rib, a hinge, a flange, a tab, or a side wall part formed in the main body part.

The melt may be formed by applying the thermoplastic resin containing the reinforcing fiber A supplied from a plasticizing discharge machine.

Further, a production method for a fiber-reinforced component according to the present invention may comprise: a step 1, in which a melt of a thermoplastic resin is formed in a lower die, a mat-shaped material formed from a reinforcing fiber is placed on the melt, an upper die is closed on the lower die and is pressed, and an impregnation treatment is performed, and then the mat-shaped material impregnated with the thermoplastic resin is cooled and solidified, whereby a main body part obtained from a fiber-reinforced resin is molded; and a step 2, in which after the main body part is released from the lower die and the upper die, the main body part is disposed in an injection molding die and injection molding is performed to form an additional part, whereby a fiber-reinforced component having the additional part combined with the main body part is produced.

Advantageous Effects of Invention

According to the invention, a fiber-reinforced resin in which the average fiber length is long and the content of a reinforcing fiber is high can be efficiently molded and automobile body components, electrical equipment housing components, and the like can be produced with high productivity.

BRIEF DESCRIPTION OF DRAWINGS

FIG. 1(a) is a plan view and FIG. 1(b) is a schematic cross-sectional view.

DESCRIPTION OF EMBODIMENTS

Figure 1:
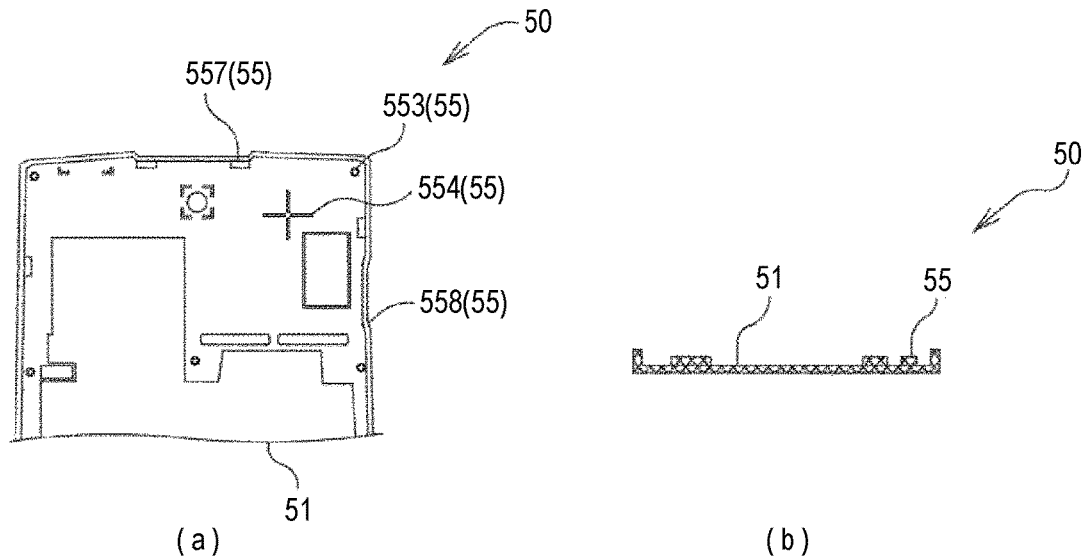
FIG. 1(a) and FIG. 1(b) are drawings showing a fiber-reinforced component to be molded according to the invention.

Hereinafter, embodiments for carrying out the invention will be described with reference to the drawings. FIG. 1(a) and FIG. 1(b) show a fiber-reinforced component to be molded according to the invention. As shown in FIG. 1(b), the invention is directed to a production method which is favorably used for molding a fiber-reinforced component 50 including a plate-shaped main body part 51 which is thin and has a large area and an additional part 55 which is formed in a convex shape on the surface of the main body part 51.

The production method according to the invention can be carried out by a step 1 in which a melt of a thermoplastic resin is formed in a lower die, a mat-shaped material formed from a reinforcing fiber B is placed on the melt, an upper die for pressing is closed on the lower die and is pressed, and an impregnation treatment is performed, and then, the mat-shaped material impregnated with the thermoplastic resin is cooled and solidified, whereby a main body part obtained from a fiber-reinforced resin is molded, and a step 2 in which the upper die for pressing is opened, an upper die for injection molding is closed on the lower die to form an injection molding die, and then, injection molding is performed to form an additional part, whereby a fiber-reinforced component having the additional part combined with the main body part is molded.

Figure 2:
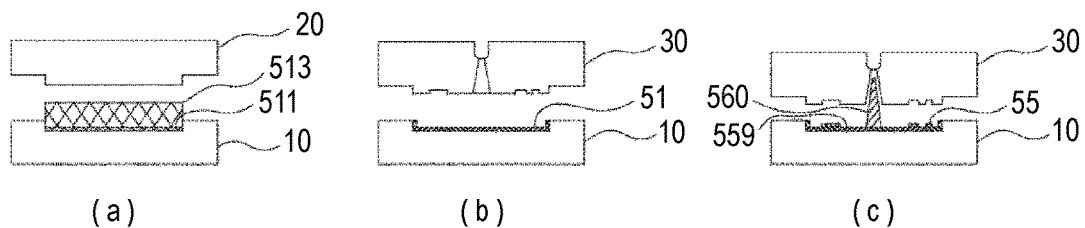
FIG. 2(a) to FIG. 2(c) are drawings showing production steps for the fiber-reinforced component according to the invention.

That is, in this production method, first, as shown in FIG. 2(a), a melt 511 of a thermoplastic resin is formed in a lower die 10, a mat-shaped material 513 formed from a reinforcing fiber B is placed on this melt 511, an upper die for pressing 20 is closed on the lower die 10, and is pressed, and an impregnation treatment is performed. Then, the lower die 10 and the upper die for pressing 20 are cooled.

In this production method, the thermoplastic resin is not particularly limited, and various thermoplastic resins such as polyethylene, polypropylene, polyethylene terephthalate, polybutylene terephthalate, polyamide, polycarbonate, and polymethyl methacrylate can be used.

As the reinforcing fiber, a carbon fiber, a glass fiber, or the like can be used, however, a carbon fiber is preferred from the viewpoint of lightweight and strength. The reinforcing fiber B becomes a base material of the fiber-reinforced component 50 according to the invention, and a mat-shaped material as described above is used. The "mat-shaped" refers to a material formed from a fiber bundle into a mat, a fabric, or a woven fabric, and a material formed from a reinforcing fiber having a desired fiber length and a desired fiber density can be easily obtained. The mat-shaped material 513 formed from this mat-shaped reinforcing fiber B is placed on the melt 511 and impregnated with a thermoplastic resin by pressing the upper die for pressing 20. The reinforcing fiber B for forming the mat-shaped material 513 hardly flows or is hardly cut during this pressing and impregnation treatment, and operations thereafter, and therefore, the fiber-reinforced component 50 having a desired average fiber length can be easily produced. The average fiber length of the reinforcing fiber B contained in the fiber-reinforced component 50 is preferably from 1 to 100 mm, more preferably from 2 to 25 mm, further more preferably from 3 to 15 mm. When the average fiber length of the reinforcing fiber B is in the above range, the content of the reinforcing fiber in the fiber-reinforced component 50 is increased, and the fiber-reinforced component 50 having high physical properties can be molded.

As the reinforcing fiber B, a material obtained only from a reinforcing fiber can be used, and a material obtained by coating the periphery of a reinforcing fiber with a thermoplastic resin, a material containing a thermoplastic resin in the form of a thread, a powder, or a sheet between fibers, or the like can be used. The above-mentioned impregnation treatment can be facilitated or accelerated by this coating with a thermoplastic resin or the like. Further, in order to rapidly heat the reinforcing fiber B, the content of the thermoplastic resin by coating or the like is desirably 30 vol % or less of the amount of the reinforcing fiber B.

The melt 511 may be formed only from a thermoplastic resin, or may be formed from a thermoplastic resin containing the reinforcing fiber A. When the thermoplastic resin containing the reinforcing fiber A is used, this reinforcing fiber A can be intermingled with the reinforcing fiber B, and the content of the reinforcing fiber in the fiber-reinforced component 50 can be increased. In the invention, the volume content of the reinforcing fiber contained in the main body part 51 of the fiber-reinforced component 50 is preferably from 10 to 70%, more preferably from 20 to 65%, further more preferably from 30 to 60%. When the volume content of the reinforcing fiber contained in the main body part 51 is in the above range, the fiber-reinforced component 50 having high physical properties can be molded.

The melt 511 may be formed by applying a thermoplastic resin containing the reinforcing fiber A supplied from an extruder. In particular, it is preferred to use a twin-screw extruder with which a roving-shaped reinforcing fiber is supplied, and the reinforcing fiber is cut by a screw, and the cut reinforcing fiber can be further cut while further kneading the reinforcing fiber with the thermoplastic resin. According to this, the melt 511 in which the reinforcing fiber A having a desired long fiber is contained in the thermoplastic resin can be formed. Then, the average fiber length of the reinforcing fiber A contained in the main body part 51 of the fiber-reinforced component 50 is preferably from 0.1 to 25 mm, more preferably from 1 to 15 mm, further more preferably from 6 to 10 mm. When the average fiber length of the reinforcing fiber A is in the above range, the content of the reinforcing fiber in the fiber-reinforced component 50 is increased, and the fiber-reinforced component 50 having high physical properties can be molded. Further, the thermoplastic resin in a high temperature state containing the reinforcing fiber A can be supplied, and therefore, production with high energy efficiency can be carried out.

Incidentally, the reinforcing fiber B and the reinforcing fiber A can be configured such that the materials, sizes, and the like of the filaments for forming the reinforcing fiber B and the reinforcing fiber A are the same or different (for example, the materials of the filaments are the same, but the sizes thereof are different). Further, the extruder may be an injection machine, and the invention can be widely used in a plasticizing discharge machine.

As described above, after the impregnation treatment, the lower die 10 and the upper die for pressing 20 are cooled. By cooling the lower die 10 and the upper die for pressing 20, the main body part 51 in a solid is molded. After the main body part 51 in a solid is molded, the upper die for pressing 20 is opened, and as shown in FIG. 2(b), an upper die for injection molding 30 is disposed, and this upper die for injection molding 30 is closed on the lower die 10, whereby an injection molding die is formed. Then, injection molding is performed, and as shown in FIG. 2(c), an additional part 55 is formed, whereby the fiber-reinforced component 50 having the additional part 55 combined with the main body part 51 is molded. Incidentally, a runner functional part 559 and a sprue 560 stacked on or integrated with the main body part 51 are formed by injection molding. The sprue 560 is removed by cutting, whereby the fiber-reinforced component 50 is molded. The lower die 10 of this embodiment has a planar shape without irregularities, but may have irregularities.

In the invention, injection molding is performed after the main body part 51 is converted to a solid state, that is, after the thermoplastic resin impregnated into the reinforcing fiber of the main body part 51 has been already converted to a solid state, and therefore, there are no problems with orientation or bias of the reinforcing fiber. According to the invention, problems associated with a conventional insert molding method, in which a material formed by stacking a prepreg, or a material formed by stacking a prepreg and a resin sheet is heated and press molded can be solved.

As the resin subjected to this injection molding, a thermoplastic resin or a thermoplastic resin containing a reinforcing fiber M can be used. As this thermoplastic resin, a thermoplastic resin which is the same as or different from the thermoplastic resin for forming the melt 511 can be used. As the reinforcing fiber M, the same material (the material and size of the filament) as the reinforcing fiber B or the reinforcing fiber A can be used. Further, as the reinforcing fiber M, a material different from the reinforcing fiber B or the reinforcing fiber A can be used.

The average fiber length of the reinforcing fiber M contained in the additional part 55 is preferably from 0.1 to 25 mm, more preferably from 2 to 15 mm, further more preferably from 3 to 6 mm. When the average fiber length of the reinforcing fiber M is in the above range, the content of the reinforcing fiber in the fiber-reinforced component 50 is increased, and the fiber-reinforced component 50 having high physical properties can be molded. Further, the volume content of the reinforcing fiber M in the additional part 55 can be made to fall within the range of 0 to 50%. The volume content of the reinforcing fiber M contained in the additional part 55 is more preferably from 10 to 40%.

Figure 3:
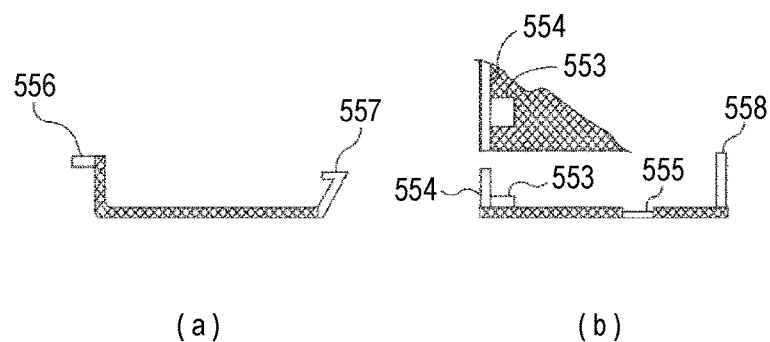
FIG. 3(a) and FIG. 3(b) are drawings showing respective examples of an additional part.

In the additional part 55 formed by injection molding, as shown in FIG. 1(a), FIG. 3(a), and FIG. 3(b), a boss 553, a rib 554, a hinge 555, a flange 556, a tab 557, a side wall 558, and the like are included. Further, in the additional part, the above-mentioned runner functional part 559 is also included, however, a convex part in a convex shape is included in a wide sense which is not included in the above category.

Incidentally, in order to improve the strength of the fiber-reinforced component 50, the volume content of the reinforcing fiber A contained in the fiber-reinforced component 50 is preferably from 20 to 70%, more preferably 30 to 70%.

In the above-mentioned production method for a fiber-reinforced component, the subsequent step 2 can be performed as long as the shape of the main body part 51 formed in the step 1 is fixed by cooling. Due to this, the step 2 can be performed when the main body part 51 is still in a heated state, and therefore, the fiber-reinforced component 50 can be produced with high productivity and high energy efficiency.

Further, in the production method for a fiber-reinforced component of the invention, as described above, the impregnation treatment is performed for the mat-shaped material composed of the reinforcing fiber in the molding of the main body part 51, and therefore, unlike the method of molding a stacked prepreg by heating and pressing, there is little limit to the shape. Due to this, in the designing of the shape of the main body part 51 such as the shape or size of a circumferential wall, the cross-sectional shape, thickness, or the like, designing can be relatively freely performed. Further, by appropriately selecting a material, a form (an average fiber length, a density, a coating treatment, or the like), a content, or the like of the reinforcing fiber or the thermoplastic resin for forming the mat-shaped material or the melt, the impregnation treatment can be accelerated, and further, the fiber-reinforced component containing the reinforcing fiber having a long average fiber length at a high content can be molded.

Hereinabove, the production method for a fiber-reinforced component has been described. The production method for a fiber-reinforced component according to the invention is not limited to the above-mentioned embodiment. For example, in the molding of the additional part 55 of the fiber-reinforced component 50, it is more preferred to perform injection molding using a new injection molding die than using an injection molding die formed from the above-mentioned lower die 10 and upper die for injection molding 30 in some cases. The invention can be applied also to such a case. That is, the production method for a fiber-reinforced component according to the invention may be a method carried out by a step 1 in which a melt of a thermoplastic resin is formed in a lower die, a mat-shaped material composed of a reinforcing fiber is placed on the melt, an upper die is closed on the lower die and is pressed, and an impregnation treatment is performed, and then, the mat-shaped material is cooled and solidified, whereby a main body part composed of a fiber-reinforced resin is molded, and a step 2 in which after the molded main body part is released from the lower and upper dies, the main body part is disposed in an injection molding die and injection molding is performed to form an additional part, whereby a fiber-reinforced component having the additional part combined with the main body part is produced. Also in this production method, the step 2 can be performed when the main body part 51 is still in a heated state, and therefore, the fiber-reinforced component 50 can be produced with high productivity and high energy efficiency.

Further, in the production method for a fiber-reinforced component according to the invention, the above-mentioned step 1 and step 2 may not necessarily performed in this order. That is, a production method for a fiber-reinforced component in which first, an injection molding die is formed by closing an upper die for injection molding on a lower die, and thereafter, injection molding is performed, thereby forming an additional part, and subsequently, the additional part formed by the injection molding is cooled and solidified, and then, the upper die for injection molding is opened, a thermoplastic resin is applied to the lower die to form a melt in which the additional part protrudes, a mat-shaped material composed of a reinforcing fiber B is placed on this melt, and then, a die for pressing is closed on the lower die and pressed, an impregnation treatment is performed, followed by cooling and solidification, whereby a fiber-reinforced component in which the additional part protrudes is molded may be adopted.

Although the invention has been described in detail and with reference to specific embodiments, it is obvious to persons skilled in the art that various changes and modifications can be added without departing from the spirit and scope of the invention. This application is based on Japanese Patent Application (No. 2013-185771) filed on Sep. 6, 2013, and the contents thereof are incorporated herein by reference.

REFERENCE SINGS LIST

10: lower die
20: upper die for pressing
30: upper die for injection molding
50: fiber-reinforced component
51: main body part
511: melt
513: mat-shaped material
55: additional part
553: boss
554: rib
555: hinge
556: flange
557: tab
558: side wall
559: runner functional part
560: sprue

The invention claimed is:

1. A production method for a fiber-reinforced component, comprising:
   a step 1, in which a melt of a thermoplastic resin is formed in a lower die, a mat-shaped material formed from a reinforcing fiber B is placed on the melt, an upper die for pressing is closed on the lower die and is pressed, and an impregnation treatment is performed, and then the mat-shaped material impregnated with the thermoplastic resin is cooled and solidified, whereby a main body part obtained from a fiber-reinforced resin is molded; and
   a step 2, in which the upper die for pressing is opened, an upper die for injection molding is closed on the lower die to form an injection molding die, and then injection molding is performed to form an additional part, whereby a fiber-reinforced component having the additional part combined with the main body part is molded.

2. The production method for a fiber-reinforced component according to claim 1, wherein the melt is formed only from a thermoplastic resin or formed from a thermoplastic resin containing a reinforcing fiber A.

3. The production method for a fiber-reinforced component according to claim 2, wherein the reinforcing fiber A has an average fiber length of 0.1 to 25 mm.

4. The production method for a fiber-reinforced component according to claim 1, wherein the reinforcing fiber B has an average fiber length of 1 to 100 mm.

5. The production method for a fiber-reinforced component according to claim 1, wherein the volume content of the reinforcing fiber in the main body part of the fiber-reinforced component is from 10 to 70%.

6. The production method for a fiber-reinforced component according to claim 1, wherein the additional part contains a reinforcing fiber M having an average fiber length of 0.1 to 25 mm at a volume content of 0 to 50%.

7. The production method for a fiber-reinforced component according to claim 1, wherein the additional part is a convex part, a boss, a rib, a hinge, a flange, a tab, or a side wall part formed in the main body part.

8. The production method for a fiber-reinforced component according to claim 1, wherein the melt is formed by applying the thermoplastic resin containing the reinforcing fiber A supplied from a plasticizing discharge machine.

9. The production method for a fiber-reinforced component according to claim 1, wherein in the step 1, the melt of the thermoplastic resin including the mat-shaped material by the impregnation treatment is solidified by cooling the lower die and the upper die for pressing, whereby the main body part obtained from the fiber-reinforced resin is molded.

10. The production method for a fiber-reinforced component according to claim 1, wherein the fiber-reinforced component is molded by cutting a sprue after performing the injection molding in the step 2.

11. The production method for a fiber-reinforced component according to claim 1, wherein a thermoplastic resin for injection molding is supplied to the main body part through the upper die for injection molding in the step 2.

12. The production method for a fiber-reinforced component according to claim 11, wherein the thermoplastic resin for injection molding contains a reinforcing fiber M.

13. The production method for a fiber-reinforced component according to claim 1, wherein the thermoplastic resin is polyethylene, polypropylene, polyethylene terephthalate, polybutylene terephthalate, polyamide, polycarbonate, or polymethyl methacrylate.

\* \* \* \* \*